(12) United States Patent
Hammerschmidt

(10) Patent No.: US 7,746,611 B2
(45) Date of Patent: Jun. 29, 2010

(54) ESD PROTECTIVE CIRCUIT HAVING LOW LEAKAGE CURRENT

(75) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 349 days.

(21) Appl. No.: 11/837,369

(22) Filed: Aug. 10, 2007

(65) Prior Publication Data

US 2008/0037189 A1 Feb. 14, 2008

(30) Foreign Application Priority Data

Aug. 10, 2006 (DE) ............... 10 2006 037 500

(51) Int. Cl.
*H02H 9/00* (2006.01)
(52) U.S. Cl. .................. 361/56; 361/91.1; 361/111
(58) Field of Classification Search ............... 361/56, 361/111
See application file for complete search history.

(56) References Cited

U.S. PATENT DOCUMENTS

| | | | |
|---|---|---|---|
| 5,719,427 A | 2/1998 | Tong et al. | |
| 5,806,522 A * | 9/1998 | Katims | .......... 600/554 |
| 5,872,379 A | 2/1999 | Lee | |
| 5,930,094 A | 7/1999 | Amerasekera et al. | |
| 6,172,404 B1 | 1/2001 | Chen et al. | |
| 6,310,379 B1 | 10/2001 | Andresen et al. | |
| 6,448,123 B1 | 9/2002 | Lee et al. | |
| 6,469,353 B1 * | 10/2002 | Amerasekera et al. | ...... 257/356 |
| 6,661,273 B1 | 12/2003 | Lai et al. | |
| 6,876,233 B1 * | 4/2005 | Bernardson | .......... 327/98 |
| 2002/0187601 A1 | 12/2002 | Lee et al. | |
| 2003/0151877 A1 | 8/2003 | Young et al. | |

FOREIGN PATENT DOCUMENTS

| EP | 0 753 892 A1 | 1/1997 |
|---|---|---|
| JP | 11135723 | 5/1999 |

* cited by examiner

*Primary Examiner*—Stephen W Jackson
*Assistant Examiner*—Tien Mai
(74) *Attorney, Agent, or Firm*—Slater & Matsil, L.L.P.

(57) ABSTRACT

An ESD protective circuit having a contact terminal, a first supply voltage terminal for a first supply potential, a second supply voltage terminal for a second supply potential, a transistor chain having several transistors, wherein drain terminals of the transistors are connected to one of the supply voltage terminals, wherein the control terminal of a first transistor of the transistor chain is connected to the other supply voltage terminal, wherein the source terminal of the last transistor of the transistor chain is connected to the contact terminal, and a current source which is connected to a source terminal of at least one of the transistors of the transistor chain and is able to provide a current which compensates, up to a maximum tolerable voltage deviation from the first or second supply potential at the contact terminal, a current flowing into or from the source terminal.

16 Claims, 5 Drawing Sheets

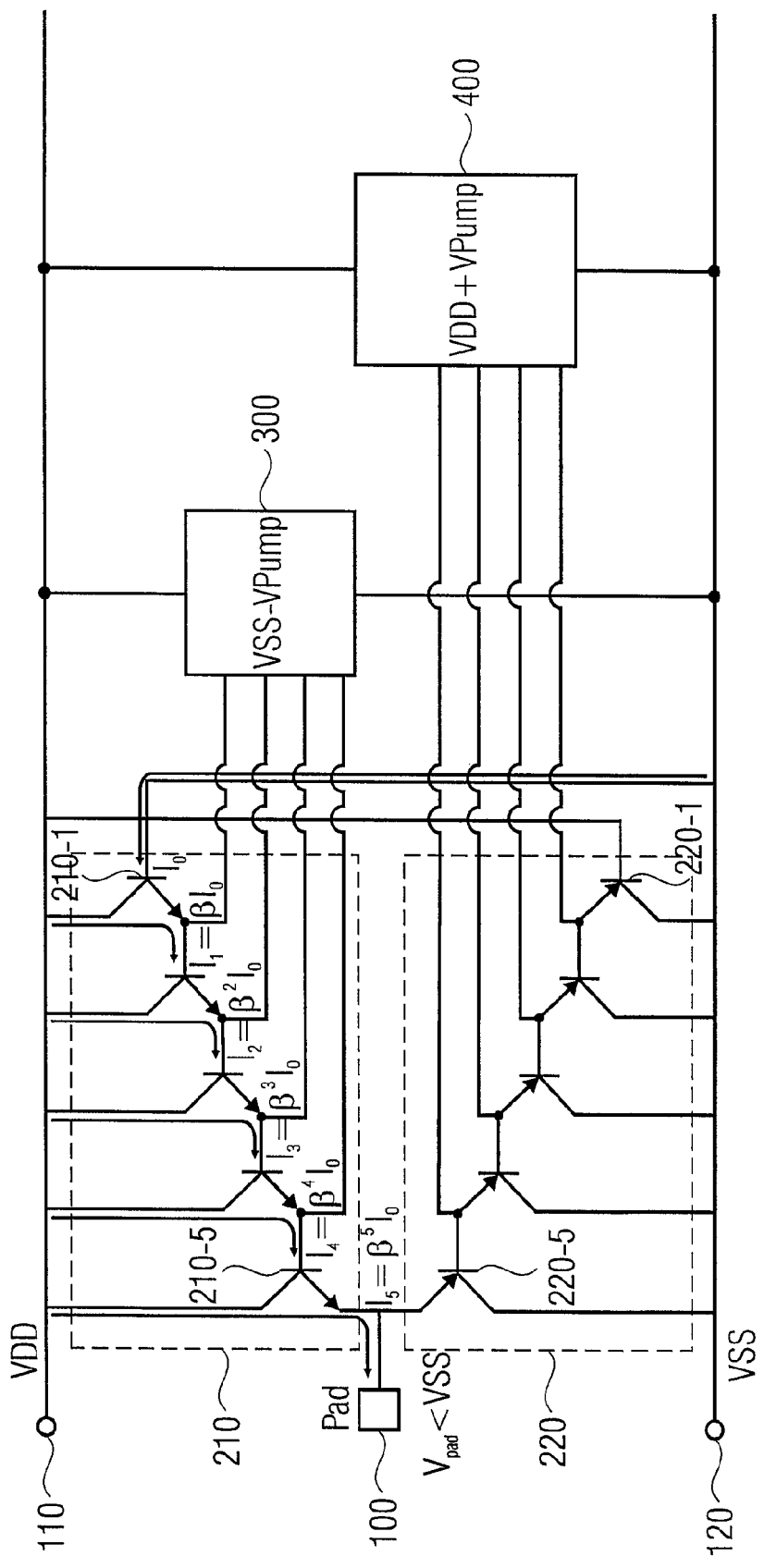

ESD PROTECTIVE CIRCUIT HAVING LOW LEAKAGE CURRENT

This application claims priority to German Patent Application 10 2006 037 500.9, which was filed Aug. 10, 2006, and is incorporated herein by reference in its entirety.

TECHNICAL FIELD

An embodiment of the present invention relates to an ESD (Electrostatic Discharge) protective circuit having low leakage current as may, for example, be used for protecting integrated circuits.

BACKGROUND

Electrostatic discharge is, for example, an electrical current impulse that, triggered by a great difference in potential, can flow through electrically conducting, but also through a normally electrically insulating material.

Integrated circuits (ICs) are often damaged by voltage peaks that overload active elements within the integrated circuit and can cause permanent damage. When, for example, a body having static electricity contacts metallic pins of an IC, it will discharge a high voltage through the metallic pins of the IC, that may result in its internal circuit being damaged. Electrostatic discharge can also cause an electrical system to lose its effectiveness.

An ESD protective circuit can prevent damaging effects of electrostatic discharge. At the same time, an ESD protective circuit must be able to withstand the energy of the electrostatic discharge in order not to be damaged itself. Furthermore, an ESD protective circuit should only intervene if there is electrostatic discharge.

In normal operation of the integrated circuit, i.e. when there is no electrostatic discharge at the input/output contact of the IC, it is advantageous for reasons of current consumption of the integrated circuit when no or only a low current flows through the input/output contacts of the IC. Low currents through the input/output contacts will only be demanded if the circuit to be protected is energized, i.e., in operation. Signals from sensors that are either supplied from a different supply voltage than, for example, evaluating ICs to be protected, or signals in which overvoltages or undervoltages at the input/output contacts of the evaluating IC may arise due to shifts of reference potentials on long lines, may allow the input voltages of the IC to exceed an upper supply voltage (VDD) or fall below a lower supply voltage (VSS). Thus, an ESD protective circuit should be dimensioned such that it comprises only low input currents at input voltages to be tolerated slightly over the upper supply voltage (VDD) or slightly below the lower supply voltage (VSS).

SUMMARY OF THE INVENTION

According to an embodiment, an ESD protective circuit may have a contact terminal, a first supply voltage terminal for a first supply potential, a second supply voltage terminal for a second supply potential, a transistor chain of several transistors, wherein drain terminals of the transistors are connected to one of the supply voltage terminals, wherein a control terminal of a first transistor of the transistor chain is connected to the other one of the supply voltage terminals, wherein the control terminals of the one or several remaining transistors are each connected to the source terminal of the previous transistor, and wherein the source terminal of a last transistor of the transistor chain is connected to the contact terminal, and a current source which is connected to a source terminal of at least one of the transistors of the transistor chain and is able to provide a current that compensates, up to a maximum tolerable voltage deviation from the first or second supply potential at the contact terminal, a current flowing into or from the source terminal, wherein the first supply potential is higher than the second supply potential.

Thus, embodiments of the present invention are advantageous in that, by using the current source that is connected to a source terminal of one of the transistors of the transistor chain, a control current of a transistor downstream of the feeding node can be reduced and/or compensated to reduce a leakage current of the transistor chain into and/or from the contact terminal.

BRIEF DESCRIPTION OF THE DRAWINGS

Embodiments of the present invention will be detailed subsequently referring to the appended drawings, in which:

FIG. 5 is a basic circuit diagram of a combined ESD under/overvoltage protective circuit comprising two current sources according to an embodiment of the present invention.

DETAILED DESCRIPTION OF ILLUSTRATIVE EMBODIMENTS

Figure 1:
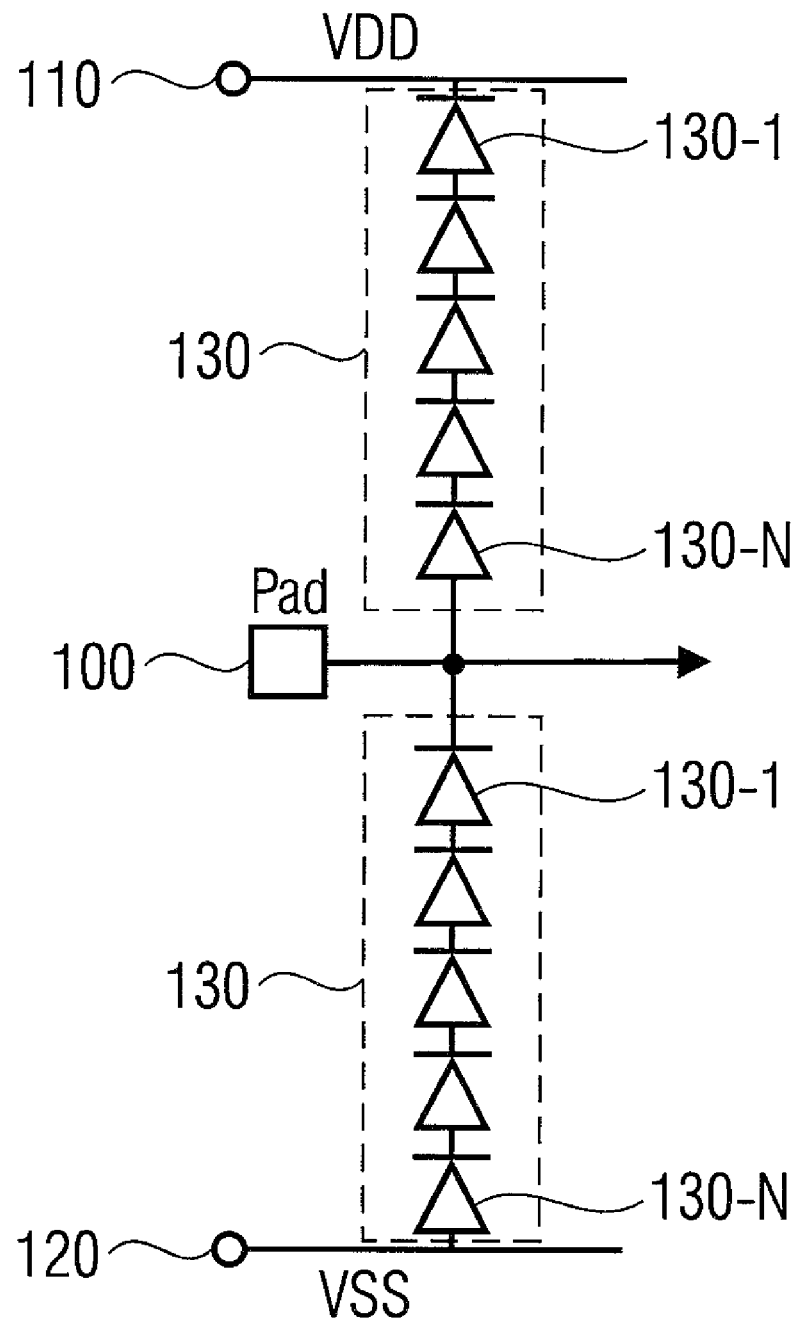
FIG. 1 is a circuit diagram of a conventional ESD protective circuit comprising the diodes connected in series.

With regard to the subsequent description, it should be kept in mind that same functional elements or functional elements having the same effect in the different embodiments are given the same reference numerals and the descriptions of these functional elements in the different embodiments discussed below are mutually interchangeable.

FIG. 1 exemplarily shows a conventional ESD protective circuit for an integrated circuit not shown in FIG. 1.

The ESD protective circuit comprises an input/output contact terminal 100, a first supply voltage terminal 110 for a first supply potential VDD and a second supply voltage terminal 120 for a second supply potential VSS. A first diode series connection 130 is forward-connected between the contact terminal 100 and the first supply voltage terminal 110. For reasons of clarity, however, only a first and a last diode of the diode series connection 130 are designated by the reference numerals 130-1 and 130-N, respectively, wherein N is the number of the diodes connected in series. In addition, a second diode series assembly 130 is forward-connected between the second supply voltage terminal 120 and the contact terminal 100. The arrow indicated in FIG. 1 is to indicate a signal path from the contact terminal 100 to an integrated circuit to be protected which is not shown.

The ESD protective circuit shown in FIG. 1 is suitable for input/output contacts or pads which may be subjected to overvoltages relative to the upper supply voltage VDD, or undervoltages relative to the lower supply voltage VSS. The number of diodes of the diode series assembly or diode stack 130 connected in series depends on a quantity of an overvoltage and/or undervoltage $V_{PAD}$ to be tolerated (exemplarily VSS−2V<$V_{PAD}$<VDD+2V). If an overvoltage impulse of a voltage above the overvoltage to be tolerated occurs at the contact terminal 100, i.e., exemplarily $V_{PAD}$>VDD+2V, the overvoltage will be reduced with a current via the first diode series connection or first diode stack 130 in forward direction to VDD. With a negative overvoltage and/or undervoltage, i.e., exemplarily $V_{PAD}$<VSS−2V, the undervoltage will be reduced with a current from VSS via the second diode stack 130 to the contact terminal 100.

In an integrated CMOS technology, in particular BiCMOS technology, due to the commons substrate, no insulating diode can be realized and the diode stack 130 represents a series connection of p-n-p base-emitter separations having a common collector (in the case of a technology on a p-substrate base, the common substrate) connected to VSS. An integrated diode series connection generally represents a series connection of parasitic p-n-p transistors having a common collector (p-substrate) connected to VSS. Such a series assembly of transistors is generally referred to as a Darlington assembly. A difference in potential between $V_{PAD}$ and VSS causes a leakage current from $V_{PAD}$ via n-wells and a p-substrate region towards VSS. There is an exponential connection between the difference in potential $V_{PAD}$−VSS and the leakage current. In applications in which a low current consumption is essential, exemplarily in applications in mobile terminals of limited energy supply, low and/or no leakage current is desirable.

Figure 2:
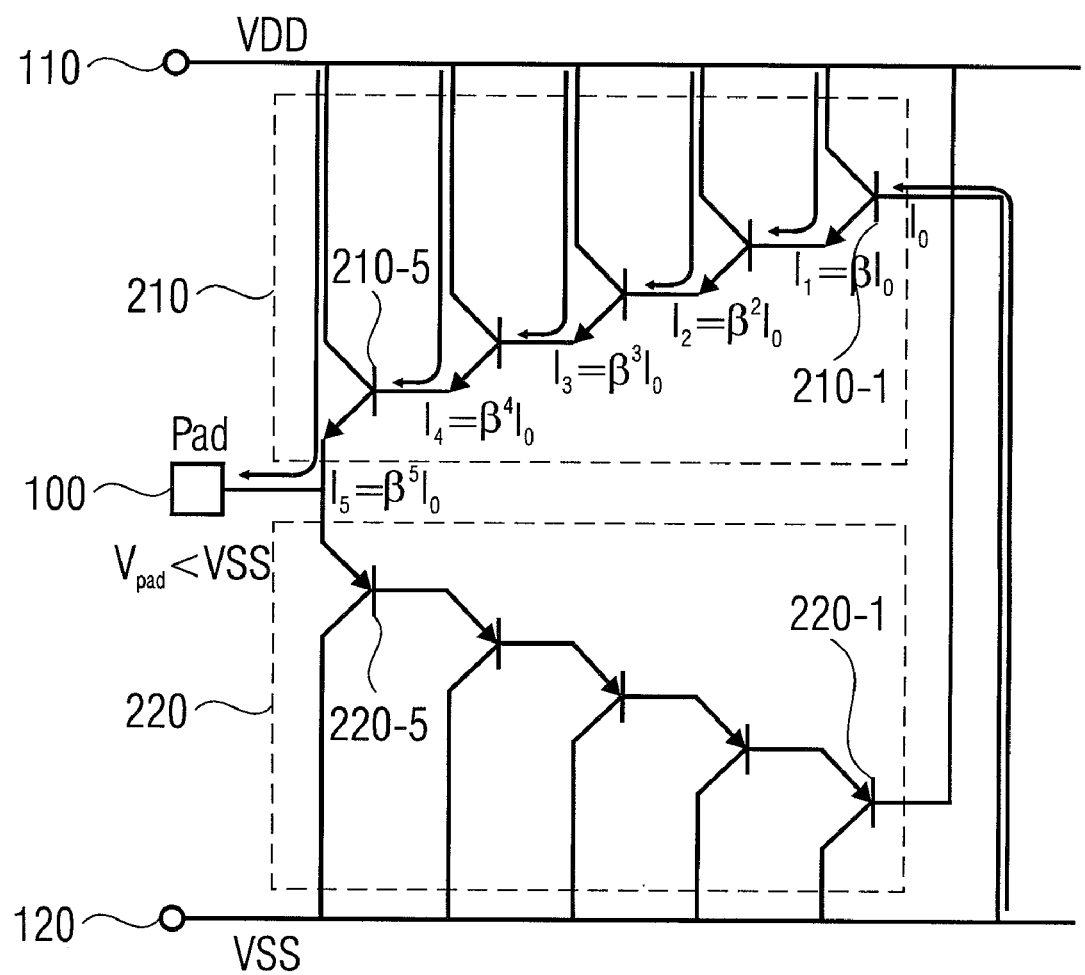
FIG. 2 is a circuit diagram of a conventional ESD protective circuit comprising a Darlington circuit of an n-p-n transistor and a Darlington circuit of p-n-p transistors.

FIG. 2 shows a conventional ESD protective circuit comprising parasitic transistors for overvoltages and/or undervoltages outside a tolerable range around a first supply voltage VDD and a second supply voltage VSS, respectively.

The ESD protective circuit illustrated in FIG. 2 comprises the contact terminal 100, the first supply voltage terminal 110 and the second supply voltage terminal 120. Additionally, the circuit includes a first transistor chain 210 which comprises five n-p-n transistors of which for reasons of clarity only two are designated by the reference numeral 210-1 and 210-5. A second transistor chain 220 comprises a Darlington assembly of five p-n-p transistors of which only two are designated by the reference numbers 220-1 and 220-5.

A base terminal of a first n-p-n transistor 210-1 of the first transistor chain 210 is coupled to the second supply voltage terminal 120 for the second supply potential VSS. An emitter terminal of the first n-p-n transistor 210-1 of the first transistor chain 210 is coupled to the base terminal of a second n-p-n transistor of the first transistor chain 210. A collector terminal of the first n-p-n transistor 210-1 of the first transistor chain 210 is connected to the first supply voltage terminal 110 for the first supply potential VDD. The emitter terminal of the second n-p-n transistor of the first transistor chain 210 in turn is connected to the base terminal of a third n-p-n transistor of the first transistor chain, wherein the emitter terminal of the third n-p-n transistor is connected to the base terminal of a fourth n-p-n transistor and the emitter terminal of the fourth n-p-n transistor is connected to the base terminal of the fifth or last n-p-n transistor 210-5 of the transistor chain 210. The collector terminals of all the n-p-n transistors of the first transistor chain 210 are connected to the first supply voltage terminal 110 for the first supply potential VDD. The emitter terminal of the last n-p-n transistor 210-5 of the transistor chain 210 is additionally coupled to the contact terminal 100 for the contact potential $V_{PAD}$.

The second transistor chain 220 comprises a first p-n-p transistor 220-1 the base terminal of which is coupled to the first supply voltage terminal 110 for the first supply potential VDD. The emitter terminal of the first p-n-p transistor 220-1 of the second transistor chain 220 is coupled to a base terminal of a second p-n-p transistor of the second transistor chain 220. The emitter terminal of the second p-n-p transistor of the second transistor chain 220 in turn is coupled to a base terminal of a third p-n-p transistor the emitter terminal of which in turn is coupled to the base terminal of a fourth p-n-p transistor. The emitter terminal of the fourth p-n-p transistor of the second transistor chain 220 is coupled to the base terminal of the fifth or last p-n-p transistor 220-5 of the second transistor chain 220. The collector terminals of all the p-n-p transistors of the second transistor chain 220 are connected to the second supply voltage terminal 120 for the second supply potential VSS. The emitter terminal of the last p-n-p transistor 220-5 of the second transistor chain 220 is connected to the contact terminal 100.

To illustrate a mode of functioning of the ESD protective circuit shown in FIG. 2, FIG. 2 shows a current path for a negative overvoltage and/or undervoltage at the input terminal 100, i.e., $V_{PAD}$<VSS. If the voltage $V_{PAD}$ at the contact terminal 100 roughly becomes smaller than the second supply voltage VSS minus five times the base-emitter voltage $V_{BE}$ of an n-p-n transistor of the first transistor chain 210, i.e., $V_{PAD}$<VSS−5·$V_{BE}$, the transistors of the Darlington assembly 210 will switch through and the undervoltage $V_{PAD}$<VSS−5·$V_{BE}$ can be reduced via the current flow indicated in FIG. 2 via the transistors of the first transistor chain 210 to the contact terminal 100.

When considering the ESD protective circuit of FIG. 2, this is a multiple Darlington circuit and the current by which the pad or contact terminal 100 is loaded with a negative input voltage $V_{PAD}$ will not be, like in the diode stack 130 illustrated in FIG. 1, the current through a base-emitter diode across which one fifth of the negative input voltage, i.e., (VSS−$V_{PAD}$)/5, drops, but the base current $I_0$ of the transistor 210-1 amplified by the fifth power of the transistor current amplification β the base of which is at the second supply potential VSS. A decreasing current amplification of the transistor chain 210 by high-current injection is neglected here.

If a voltage $V_{PAD}$ at the pad 100 is within the overvoltage and/or undervoltage window to be tolerated (exemplarily VSS−2V<$V_{PAD}$<VDD+2V), very low leakage currents will be necessary at the contact terminal 100, advantageously, leakage currents smaller than 1 nA. What aggravates the situation is that at high temperatures, a voltage drop across a base-emitter separation of a transistor great enough to serve as ESD protection will only be very small (exemplarily 300 mV<$V_{BE}$<400 mV). Thus, about 5-7 diodes should be connected in series to be able to meet the overvoltage requirement in combination with a low pad current. This in turn can improve an ESD protective performance considerably since with a high current necessary for limiting an ESD pulse, higher voltages frequently drop across one of the transistor chains 210 and/or 220 than would be the case with an individual diode. Individual diodes are typically used as standard solutions for inputs where a voltage remains within the operating voltage limits. With an increasing voltage drop across the transistor chains 210 and/or 220, however, a risk that internal circuits of an IC to be protected are damaged by an increased terminal voltage $V_{PAD}$−VDD and/or $V_{PAD}$−VSS also increases.

Different well-known ESD structures exemplarily use antiserial diodes to protect an input of an integrated circuit from electrostatic discharge. One of the two diodes here frequently operates as a Zener or Avalanche diode. Its breakdown voltage, together with the flow voltage of the respective other diode, here determines the maximum and/or minimum allowable input voltage above and below, respectively, which a current consumption of the ESD structure increases greatly.

These ESD structures, however, may frequently be realized by additional implantations for adjusting the breakdown, and often only in connection with so-called buried layers to decrease bulk resistances, thereby causing considerable additional cost for a manufacturing process which often cannot be justified for a few special ESD pads.

After having described conventional ESD protective circuits referring to FIGS. 1 and 2, ESD protective circuit according to embodiments of the present invention will be discussed in greater detail below referring to FIGS. 3-5.

In order to be able to reduce the leakage currents described before, an ESD protective circuit according to an embodiment of the present invention comprises a current source which is connected to an emitter terminal of at least one of the transistors of the transistor chains 210 and/or 220 and can provide a current $I_{bias}$ which compensates, up to maximum tolerable voltage deviation $\Delta V_{max}$ from the first supply potential VDD or the second supply potential VSS at the contact terminal 100, a current flowing into or from the emitter terminal.

If the maximum tolerable voltage deviation $\Delta V_{max}$ is exceeded by the first supply potential VDD or the second supply potential VSS, one of the transistor chains 210 and/or 220 should switch through correspondingly, i.e., allow electrostatic discharge from the contact terminal 100 towards a corresponding one of the two supply voltage terminals 110 and/or 120.

Thus, embodiments of the present invention are advantageous in that in normal operation of an integrated circuit comprising an inventive ESD protective circuit, leakage currents of the ESD protective circuit according to an embodiment of the present invention can be prevented and/or reduced, and thus a lower power consumption of the integrated circuit is made possible.

Figure 3:
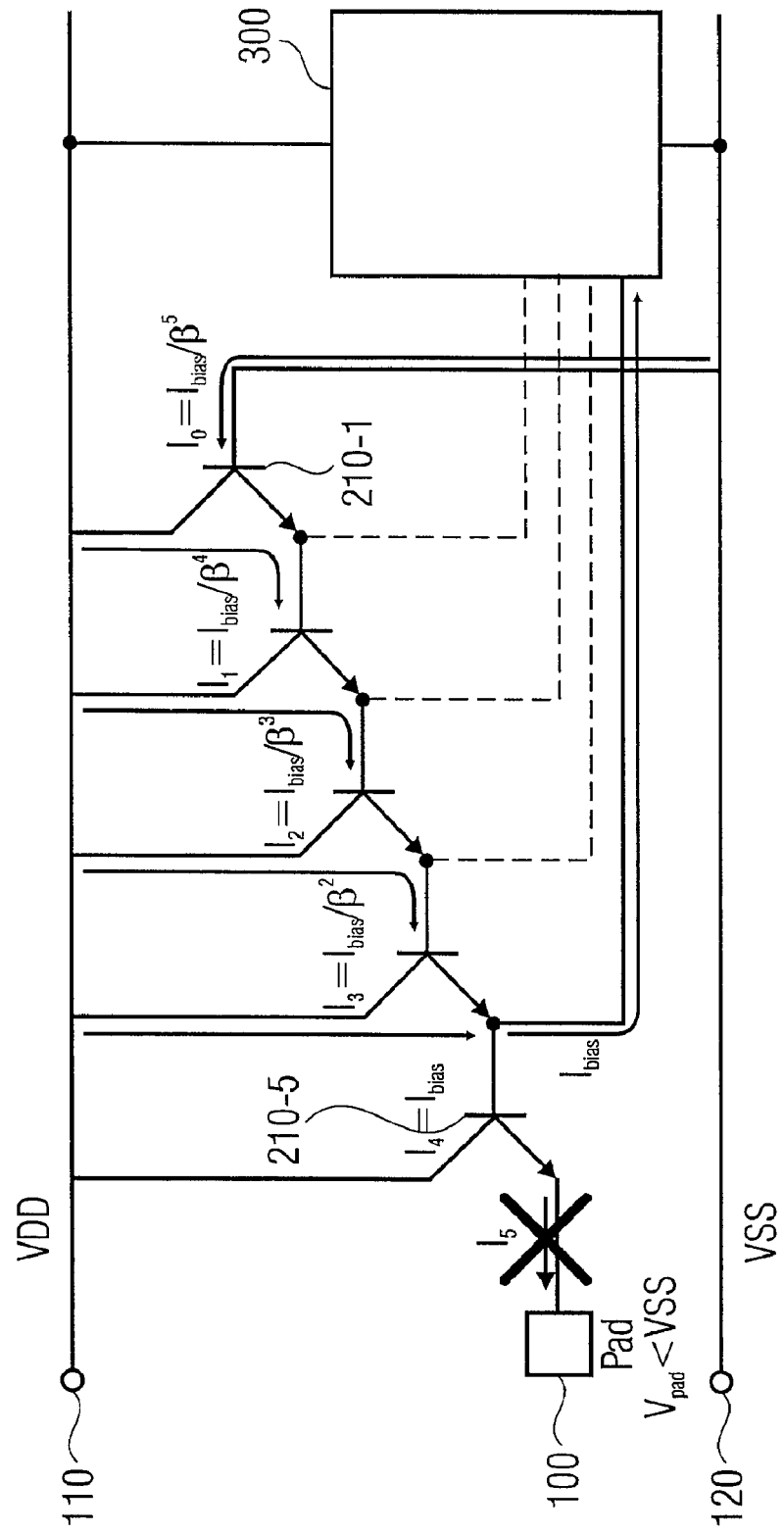
FIG. 3 is a basic circuit diagram of an undervoltage protective circuit comprising a current source according to an embodiment of the present invention.

FIG. 3 shows an ESD protective circuit for an undervoltage protection according to an embodiment of the present invention.

The inventive ESD protective circuit shown in FIG. 3 comprises the contact terminal 100, the first supply voltage terminal 110 for the first supply potential VDD, and the second supply voltage terminal 120 for the second supply potential VSS. In addition, the inventive ESD protective circuit comprises a Darlington circuit 210 of n-p-n transistors which are connected as described referring to FIG. 2. In addition, the ESD protective circuit according to an embodiment of the present invention shown in FIG. 3 comprises a current providing circuit 300 which is connected between the first supply potential VDD and the second supply potential VSS and is connected to an emitter terminal of the fourth n-p-n transistor and/or a base terminal of the fifth n-p-n transistor 210-5 of the transistor chain 210.

For the actual ESD protection, the inventive ESD protective circuit still uses the Darlington circuit 210 of parasitic bipolar transistors 210-1 to 210-5 and additionally uses at least one current source 300 supplying a current $I_{bias}$ to and/or draining it from the transistor chain 210. The additional current $I_{bias}$ supplied and/or drained serves to reduce or completely compensate the base current of the transistor 210-5 downstream of the supplying node. Since the current source 300 necessary has to provide a current $I_{bias}$ driven by a potential below the second supply voltage VSS, the current source 300 according to an embodiment of the present invention comprises a charge pump to reduce the voltage. The order of magnitude of the current $I_{bias}$ which can be "sucked" by the charge pump 300 has to be greater than the emitter current of the transistor driving the base of the transistor 210-5. Thus, the current source 300, however, is not in the current path of the ESD structure, but only provides the maximum current $I_{bias}$ it can provide since it operates, as has been previously discussed, as a current source.

In a normal operation of an integrated circuit to be protected, i.e., when a voltage within the overvoltage and/or undervoltage window (exemplarily VSS−2V<$V_{PAD}$<VDD+ 2V) to be tolerated is applied to the contact terminal 100, a leakage current $I_5$ into and/or from the contact terminal 100 is to be minimized. In the case in which a lower voltage $V_{PAD}$ than the second supply voltage VSS is applied to the pad 100, wherein $V_{PAD}$ only deviates slightly from VSS (i.e., exemplarily VSS−$V_{PAD}$<5·$V_{BE}$), so that the transistors of the transistor chain 210 do not yet switch through, a leakage current will form, as is indicated in FIG. 3. A low leakage current $I_0$ flows to the base of the first transistor 210-1 of the transistor chain 210 and is amplified by a current amplification factor β over the subsequent transistor stages, so that the base current $I_4$ of the last transistor 210-5 corresponds to the base current of the first transistor 210-1 multiplied by $β^4$, i.e. $I_4=I_0·β^4$. In the maximum tolerable undervoltage, i.e., when the transistors of the transistor chain 210 are shortly from switching through, the current $I_4$ at the base of the last transistor 210-5 is at a maximum. In order to reduce and/or avoid the leakage current $I_5$ in the contact terminal 100, the current source and/or the charge pump 300 sucks the base current $I_4$ of the transistor 210-5 off, so that the emitter current $I_5$ of the transistor 210-5 in the contact terminal 100 can be neglected. As soon as the voltage $V_{pad}$ becomes smaller than the minimum undervoltage to be tolerated, the base current of the last transistor 210-5 will become greater than the maximum current $I_{4, max}$ which can be sucked off from the charge pump 300, and this is where the "normal" mode of functioning of the ESD protective structure begins.

Two criteria result in the selection of the node into which the current of the current source 300 is to be fed.

The first criterion is minimizing the input current $I_5$ at the pad 100. The input current $I_5$ at the pad 100 will be minimal if the current $I_{bias}$ is supplied and/or sucked directly at the base terminal of the last transistor 210-5 in the transistor chain 210, since the last transistor 210-5 in this case no longer receives any base current. As has been described before, the current source 300 here is to be dimensioned such that it will supply and/or suck at least a current $I_{bias}$ which is as high as the current $I_{4, max}$ flowing to the base of the last transistor 210-5 at the maximum tolerable overvoltage and/or undervoltage when the current source 300 is not connected. However, the current source 300 here necessitates a current $I_{bias}$ which is greater than the base current $I_0$ of the first transistor 210-1 of the transistor chain 210 by the fourth power of the current amplification β, i.e., $I_{bias}=I_0·β^4$. Thus, the current source and/or the charge pump 300, however, is loaded to a maximum.

A second criterion is minimizing the load of the current source and/or charge pump 300. The load of the charge pump 300 will be minimal if the current $I_{bias}$ is supplied directly at the base terminal of the second transistor in the transistor chain 210, since only the base current $I_1=I_0·β$ amplified once of the first transistor 210-1 of the transistor chain 210 has to be compensated here. However, only a reduction in the input leakage current into the pad 100 by a power of the current amplification β can be achieved here.

It can be derived from combining the two criteria, that the smallest possible leakage current at the pad 100, when minimal additional loading of the charge pump 300, can be achieved when currents are supplied to all or to at least several base terminals of the transistors of the transistor chain 210, as is indicated in FIG. 3. The charge pump is, in the ideal case, loaded by four times the base current amplified once $I_1=I_0 \cdot \beta$.

The undervoltage protective circuit according to the inventive concept described before according to FIG. 3, however, can also be transferred to an overvoltage protective circuit. FIG. 4 shows an overvoltage protective circuit according to an embodiment of the present invention.

Figure 4:
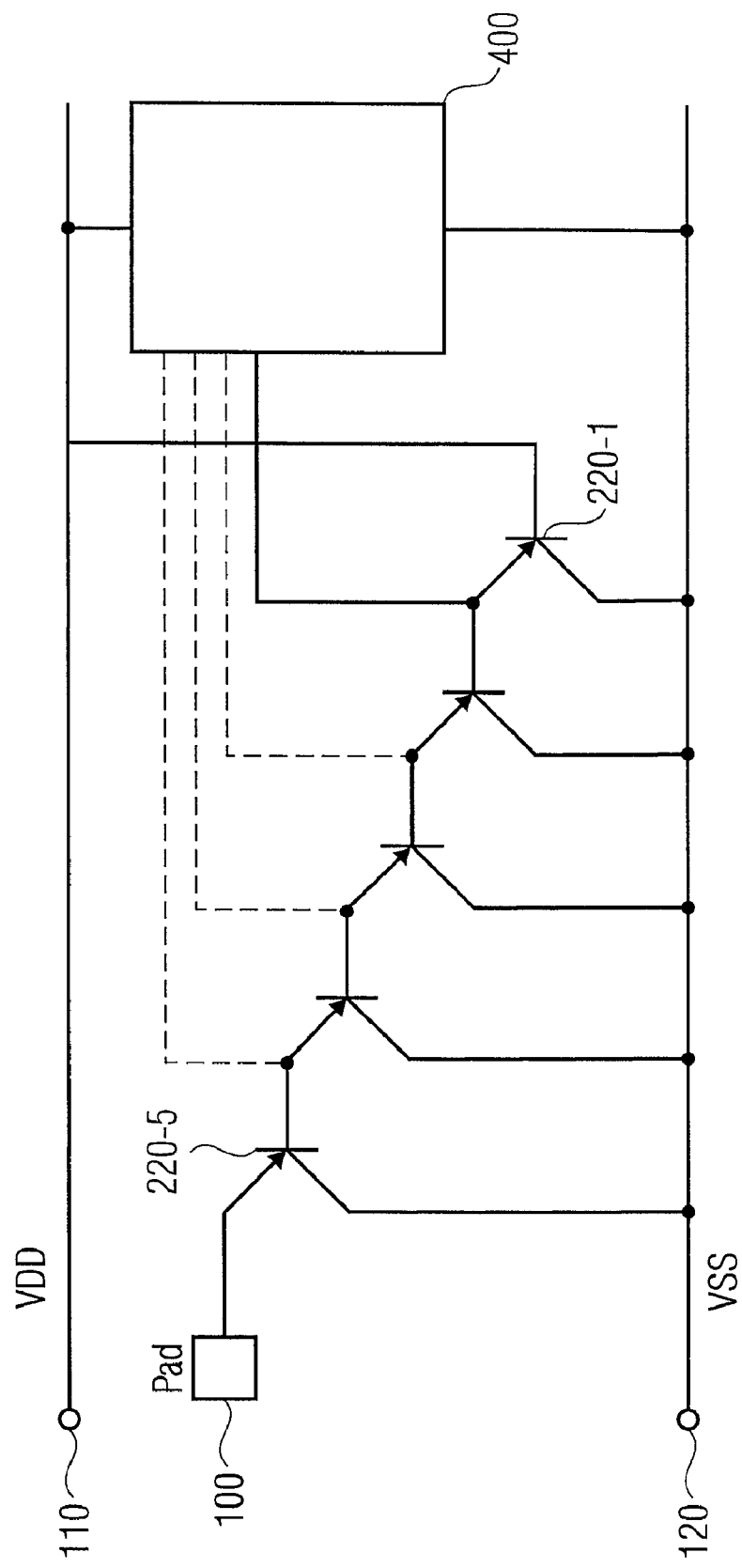
FIG. 4 is a basic circuit diagram of an ESD overvoltage protective circuit comprising a current source according to an embodiment of the present invention.

The inventive overvoltage protective circuit shown in FIG. 4 comprises the contact terminal 100, the first supply voltage terminal 110 for the first supply potential VDD and the second supply voltage terminal 120 for the second supply potential VSS. Additionally, the inventive ESD protective circuit comprises a Darlington circuit 220 of p-n-p transistors which are connected as is described referring to FIG. 2. Furthermore, the overvoltage protective circuit according to an embodiment of the present invention shown in FIG. 4 comprises a current providing circuit 400 which is connected between the first supply potential VDD and the second supply potential VSS and is connected to an emitter terminal of the first p-n-p transistor 220-1 and/or a base terminal of the second p-n-p transistor of the transistor chain 220.

Since the current source 400 necessary here has to provide a current $I_{bias}$ driven by a potential above the first supply voltage VDD, the current source 400, according to an embodiment of the present invention, exemplarily comprises a charge pump to increase the voltage. Here, too, the smallest possible leakage current at the pad 100, when additionally loading the charge pump 400 minimally, can be achieved when currents are fed to all or to at least several base terminals of the transistors of the transistor chain 220, as is indicated in FIG. 4. The charge pump is, in the ideal case, loaded by four times the base current amplified once $I_1=I_0 \cdot \beta$.

According to another embodiment of the present invention, an overvoltage protection according to FIG. 4 may of course also be combined with an undervoltage protection according to FIG. 3. A combined undervoltage/overvoltage protective circuit according to an embodiment of the present invention is shown in FIG. 5. The modes of functioning of the undervoltage/overvoltage protective circuit becomes evident from the mode of functioning of the individual circuits of FIGS. 3 and 4 already described before.

With regard to further embodiments of the present invention, various embodiments of the transistors used are conceivable. As has been described before, bipolar transistors may exemplarily be used. In particular, the usage of CMOS transistors is also conceivable. Depending on the embodiments, emitter or source terminals correspond to the transistor source terminal, collector or drain terminals correspond to the transistor drain terminals and base or gate terminals correspond to the transistor control terminals.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An ESD protective circuit comprising:
    a contact terminal;
    a first supply voltage terminal for a first supply potential;
    a second supply voltage terminal for a second supply potential, wherein the first supply potential is higher than the second supply potential;
    a n-p-n bipolar transistor chain comprising a plurality of n-p-n bipolar transistors, wherein collector terminals of the n-p-n bipolar transistors are connected to the first supply voltage terminal, wherein a base terminal of a first n-p-n bipolar transistor of the n-p-n bipolar transistor chain is connected to the second supply voltage terminal, wherein base terminals of the remaining n-p-n bipolar transistors are connected each to an emitter terminal of a previous n-p-n bipolar transistor, and wherein the emitter terminal of a last n-p-n bipolar transistor of the n-p-n bipolar transistor chain is connected to the contact terminal; and
    a current source which is connected to an emitter terminal of at least one of the n-p-n bipolar transistors of the n-p-n bipolar transistor chain, wherein the current source includes a voltage reducing circuit which is connected between the first and second supply voltage terminals and is able to generate a voltage lower compared to the second supply potential, and wherein the current source is able to provide a current which compensates, up to a maximum tolerable voltage deviation from the second supply potential at the contact terminal, a current flowing from the emitter terminal.

2. The ESD protective circuit according to claim 1, wherein the voltage reducing circuit includes a charge pump.

3. The ESD protective circuit according to claim 1, wherein the current source is connected to the emitter terminals of all the n-p-n bipolar transistors of the n-p-n bipolar transistor chain.

4. The ESD protective circuit according to claim 1, wherein the circuit is manufactured in a CMOS technology.

5. An ESD protective circuit comprising:
    a contact terminal;
    a first supply voltage terminal for a first supply potential;
    a second supply voltage terminal for a second supply potential, wherein the first supply potential is higher than the second supply potential;
    a p-n-p bipolar transistor chain comprising a plurality of p-n-p bipolar transistors, wherein collector terminals of the p-n-p bipolar transistors are connected to the second supply voltage terminal, wherein a base terminal of a first p-n-p bipolar transistor of the p-n-p bipolar transistor chain is connected to the first supply voltage terminal, wherein base terminals of the remaining p-n-p bipolar transistors are connected each to an emitter terminal of a previous p-n-p bipolar transistor, and wherein the emitter terminal of a last p-n-p bipolar transistor of the p-n-p bipolar transistor chain is connected to the contact terminal; and
    a current source which is connected to an emitter terminal of at least one of the p-n-p bipolar transistors of the p-n-p bipolar transistor chain, wherein the current source includes a voltage increasing circuit which is connected between the first and second supply voltage terminals and is able to generate a voltage higher compared to the first supply potential, and wherein the current source is able to provide a current which compensates, up to a maximum tolerable voltage deviation from the first supply potential at the contact terminal, a current flowing into the emitter terminal.

6. The ESD protective circuit according to claim 5, wherein the voltage increasing circuit includes a charge pump.

7. The ESD protective circuit according to claim 5, wherein the current source is connected to the emitter terminals of all the p-n-p bipolar transistors of the p-n-p bipolar transistor chain.

8. The ESD protective circuit according to claim 5, wherein the circuit is manufactured in a CMOS technology.

9. A device for ESD protection, the device comprising:
means for inputting and/or outputting a signal;
means for providing a first supply voltage;
means for providing a second supply voltage, wherein the first supply voltage is higher than the second supply voltage;
means for switching which comprises a plurality of n-p-n bipolar transistors connected in series, wherein collector terminals of the n-p-n bipolar transistors are connected to the first supply voltage, wherein a base terminal of a first n-p-n bipolar transistor of the means for switching is connected to the second supply voltage, wherein base terminals of the remaining n-p-n bipolar transistors are each connected to an emitter terminal of a previous n-p-n bipolar transistor, and wherein the emitter terminal of a last n-p-n bipolar transistor of the means for switching is connected to an input and/or output contact; and
means for providing a current which is connected to an emitter terminal of one of the plurality of n-p-n bipolar transistors of the means for providing, wherein the means for providing the current includes means for reducing a voltage which is connected between the first and second supply voltages and is able to generate a voltage lower compared to the second supply voltage, and wherein the means providing the current is able to provide a current which compensates, up to a maximum tolerable voltage deviation from the second supply voltage at the input and/or output contact, a current flowing from the emitter terminal.

10. The device according to claim 9, wherein the means for reducing the voltage includes a charge pump.

11. A device for ESD protection, the device comprising:
means for inputting and/or outputting a signal;
means for providing a first supply voltage;
means for providing a second supply voltage, wherein the first supply voltage is higher than the second supply voltage;
means for switching which comprises a plurality of p-n-p bipolar transistors connected in series, wherein collector terminals of the p-n-p bipolar transistors are connected to the second supply voltage, wherein a base terminal of a first p-n-p bipolar transistor of the means for switching is connected to the first supply voltage, wherein base terminals of the remaining p-n-p bipolar transistors are each connected to an emitter terminal of a previous p-n-p bipolar transistor, and wherein the emitter terminal of a last p-n-p bipolar transistor of the means is connected to an input and/or output contact; and
means for providing a current which is connected to an emitter terminal of one of the plurality of p-n-p bipolar transistors of the means, wherein the means for providing the current includes means for increasing a voltage which is connected between the first and second supply voltages and is able to generate a voltage higher compared to the first supply voltage, and wherein the means for providing the current is able to provide a current which compensates, up to a maximum tolerable voltage deviation from the first supply voltage at the input and/or output contact, a current flowing into the emitter terminal.

12. The ESD protective circuit according to claim 11, wherein the means for increasing the voltage includes a charge pump.

13. A method for ESD protection, the method comprising:
providing an input and/or output contact;
providing a first supply voltage;
providing a second supply voltage, wherein the first supply voltage is higher than the second supply voltage;
establishing a connection between the input and/or output contact and a terminal for the second supply voltage by means of a n-p-n bipolar transistor chain when a maximum tolerable voltage deviation from the second supply voltage is exceeded, wherein the n-p-n bipolar transistor chain comprises a plurality of n-p-n bipolar transistors, wherein collector terminals of the n-p-n bipolar transistors are connected to the first supply voltage, wherein a base terminal of a first n-p-n bipolar transistor of the n-p-n bipolar transistor chain is connected to the second supply voltage, wherein base terminals of the remaining n-p-n bipolar transistors are each connected to an emitter terminal of a previous n-p-n bipolar transistor, and wherein the emitter terminal of a last n-p-n bipolar transistor of the n-p-n bipolar transistor chain is connected to the input and/or out-put contact; and
providing a current by a current source which is connected to an emitter terminal of one of the plurality of n-p-n bipolar transistors of the n-p-n bipolar transistor chain, wherein the current source is able to generate a voltage lower compared to the second supply voltage, and wherein the current source is able to provide a current which compensates, up to a maximum tolerable voltage deviation from the second supply voltage at the input and/or output contact, a current flowing from the emitter terminal.

14. A method for ESD protection, the method comprising:
providing an input and/or output contact;
providing a first supply voltage;
providing a second supply voltage, wherein the first supply voltage is higher than the second supply voltage;
establishing a connection between the input and/or output contact and a terminal for the first supply voltage by means of a p-n-p bipolar transistor chain when a maximum tolerable voltage deviation from the first supply voltage is exceeded, wherein the p-n-p bipolar transistor chain comprises a plurality of p-n-p bipolar transistors, wherein collector terminals of the p-n-p bipolar transistors are connected to the second supply voltage, wherein a base terminal of a first p-n-p bipolar transistor of the p-n-p bipolar transistor chain is connected to the first supply voltage, wherein base terminals of the remaining p-n-p bipolar transistors are each connected to an emitter terminal of a previous p-n-p bipolar transistor, and wherein the emitter terminal of a last p-n-p bipolar transistor of the p-n-p bipolar transistor chain is connected to the input and/or out-put contact; and
providing a current by a current source which is connected to an emitter terminal of one of the plurality of p-n-p bipolar transistors of the p-n-p bipolar transistor chain, wherein the current source is able to generate a voltage higher compared to the first supply voltage, and wherein the current source is able to provide a current which compensates, up to the maximum tolerable voltage deviation from the first supply voltage at the input and/or output contact, a current flowing into the emitter terminal.

15. An ESD protective circuit comprising:
a contact terminal;
a first supply voltage terminal for a first supply potential;
a second supply voltage terminal for a second supply potential, wherein the first supply potential is higher than the second supply potential;

a n-p-n bipolar transistor chain comprising a plurality of n-p-n bipolar transistors, wherein collector terminals of the n-p-n bipolar transistors are connected to the first supply voltage terminal, wherein a base terminal of a first n-p-n bipolar transistor of the n-p-n bipolar transistor chain is connected to the second supply voltage terminal, wherein base terminals of the remaining n-p-n bipolar transistors are connected each to an emitter terminal of a previous n-p-n bipolar transistor, and wherein the emitter terminal of a last n-p-n bipolar transistor of the n-p-n bipolar transistor chain is connected to the contact terminal; and a current source which is connected to an emitter terminal of at least one of the n-p-n bipolar transistors of the n-p-n bipolar transistor chain, wherein the current source includes a charge pump which is connected between the first and second supply voltage terminals and is able to generate a voltage lower compared to the second supply potential, and wherein the current source is able to provide a current which compensates, up to a maximum tolerable voltage deviation from the second supply potential at the contact terminal, a current flowing from the emitter terminal.

16. An ESD protective circuit comprising:

a contact terminal;

a first supply voltage terminal for a first supply potential;

a second supply voltage terminal for a second supply potential, wherein the first supply potential is higher than the second supply potential;

a p-n-p bipolar transistor chain comprising a plurality of p-n-p bipolar transistors, wherein collector terminals of the p-n-p bipolar transistors are connected to the second supply voltage terminal, wherein a base terminal of a first p-n-p transistor of the p-n-p bipolar transistor chain is connected to the first supply voltage terminal, wherein base terminals of the remaining p-n-p bipolar transistors are connected each to an emitter terminal of a previous p-n-p bipolar transistor, and wherein the emitter terminal of a last p-n-p bipolar transistor of the p-n-p bipolar transistor chain is connected to the contact terminal; and a current source which is connected to an emitter terminal of at least one of the p-n-p bipolar transistors of the p-n-p bipolar transistor chain, wherein the current source includes a charge pump which is connected between the first and second supply voltage terminals and is able to generate a voltage higher compared to the first supply potential, and wherein the current source is able to provide a current which compensates, up to a maximum tolerable voltage deviation from the first supply potential at the contact terminal, a current flowing into the emitter terminal.

* * * * *